US010461954B2

(12) United States Patent
Jones et al.

(10) Patent No.: US 10,461,954 B2
(45) Date of Patent: *Oct. 29, 2019

(54) INTELLIGENT EQUIPMENT SEQUENCING

(71) Applicant: Optimum Energy LLC, Seattle, WA (US)

(72) Inventors: Thomas Jones, Seattle, WA (US); Ian Dempster, Seattle, WA (US); Clark Matthys, Seattle, WA (US); Peng Chen, Seattle, WA (US)

(73) Assignee: OPTIMUM ENERGY LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,306

(22) Filed: Mar. 30, 2018

(65) Prior Publication Data

US 2018/0323994 A1 Nov. 8, 2018

Related U.S. Application Data

(63) Continuation of application No. 14/582,732, filed on Dec. 24, 2014, now Pat. No. 9,967,107.

(51) Int. Cl.
*G05B 21/00* (2006.01)
*G01M 1/38* (2006.01)
(Continued)

(52) U.S. Cl.
CPC .......... *H04L 12/2816* (2013.01); *F24F 11/30* (2018.01); *F24F 11/62* (2018.01); *F24F 11/46* (2018.01)

(58) Field of Classification Search
CPC ..... H04L 12/2816; F24F 11/006; F24F 11/00; F24F 2011/0075; G05D 23/1917
See application file for complete search history.

(56) References Cited

U.S. PATENT DOCUMENTS 6,185,946 B1 * 2/2001 Hartman .............. F04D 15/029
62/175
8,027,742 B2 * 9/2011 Seem .................... F24F 11/006
700/28

(Continued)

OTHER PUBLICATIONS

Chan, A.L.S., "Developing future hourly weather tiles for studying the impact of climate change on building energy performance in Hong Kong," Energy and Buildings 43 (2011), pp. 2860-2868.

*Primary Examiner* — Thomas C Lee
*Assistant Examiner* — Zhipeng Wang
(74) *Attorney, Agent, or Firm* — P.G. Scott Born; Foster Pepper PLLC

(57) ABSTRACT

Systems and methods for sequencing HVAC equipment of an HVAC system using data recorded in situ to build a model capable of making predictions about equipment efficiency and using that information, in combination with predictions about building load, to produce an operational sequence for the HVAC equipment that promotes an improved or optimized overall energy efficiency for the HVAC system. In one embodiment, the process is automated and utilizes Bayesian computational models or algorithms to generate an initial sequence. The process reduces engineering hours and may advantageously provide a means to predict potential sequencing problems for similar types of HVAC equipment.

14 Claims, 3 Drawing Sheets

(51) Int. Cl.
   *G05B 13/00*   (2006.01)
   *G05B 15/00*   (2006.01)
   *G05D 23/00*   (2006.01)
   *H04L 12/28*   (2006.01)
   *F24F 11/30*   (2018.01)
   *F24F 11/62*   (2018.01)
   *F24F 11/46*   (2018.01)

(56) References Cited

U.S. PATENT DOCUMENTS

| | | | |
|---|---|---|---|
| 8,200,344 B2 | 6/2012 | Li et al. | |
| 8,200,345 B2 | 6/2012 | Li et al. | |
| 8,731,724 B2* | 5/2014 | Drees | G05B 15/02 700/276 |
| 9,286,582 B2* | 3/2016 | Drees | G06Q 10/06 |
| 2008/0262820 A1 | 10/2008 | Nasle | |
| 2010/0114385 A1* | 5/2010 | Dempster | G05B 15/02 700/276 |
| 2011/0153103 A1* | 6/2011 | Brown | G06Q 10/04 700/291 |
| 2011/0320045 A1* | 12/2011 | Salsbury | G05B 5/01 700/276 |
| 2013/0325377 A1 | 12/2013 | Drees et al. | |
| 2013/0345880 A1* | 12/2013 | Asmus | G05D 23/1917 700/276 |
| 2014/0372164 A1 | 12/2014 | Egan et al. | |
| 2015/0045982 A1 | 2/2015 | Egan et al. | |
| 2015/0046131 A1* | 2/2015 | Fei | G06F 17/5009 703/2 |
| 2015/0057810 A1* | 2/2015 | Smith | F24F 11/62 700/276 |
| 2015/0293505 A1 | 10/2015 | Acosta Gonzalez | |
| 2015/0370271 A1* | 12/2015 | Raghunathan | F24F 11/62 700/277 |

* cited by examiner

INTELLIGENT EQUIPMENT SEQUENCING

PRIORITY CLAIM

This application is a continuation of U.S. application Ser. No. 14/582,732 filed Dec. 24, 2014, entitled "INTELLIGENT EQUIPMENT SEQUENCING," which application is incorporated by reference in its entirety as if fully set forth herein.

FIELD OF THE INVENTION

The present invention generally relates to systems and methods for controlling and scheduling equipment in HVAC systems by predicting cooling loads, heating loads and equipment efficiencies using historical load and efficiency data recorded in situ by building sensors, a building automation system (BAS), an equipment automation system or some combination thereof.

BACKGROUND

Many buildings employ an HVAC system to maintain a comfortable environment. The HVAC system provides heating and cooling for the buildings. Conventionally, local engineering knowledge is used to produce a sequencing that arranges equipment (chillers, pumps, etc.) by their energy efficiency such as using the least efficient equipment only under the most extreme circumstances. To achieve a better energy efficiency and energy savings for the HVAC system, it is typically advantageous to use the equipment with the higher efficiency before bringing on other equipment that uses more energy to do the same job.

HVAC systems are designed with multiple pieces of equipment, some to do the same job as other identical pieces of equipment, like chillers in which there may be two or more water chillers as part of the building or campus HVAC system. During low cooling season only one of the chillers would be operating; whereas during high cooling season maybe all of these chillers would be operating. In addition, one or more chillers may be purposefully kept off line for a variety of reasons such as, but not limited, repairs, maintenance, etc.

Even though these chillers may be similar or identical (e.g., same manufacture, same model, etc.), the chillers may often have different efficiency's for performing the same heating or cooling task. By way of example, a chiller efficiency is typically measured as kW/ton (or other HVAC equipment efficiency measurements like Co-efficient of Performance (COP), Energy Efficiency Ratio (EER), Seasonal Energy Efficiency Ration (SEER)), which is the amount of energy (measured in kw) used by the chiller to produce cooling (measured in tons). A lower kW/ton rating indicates higher efficiency (tons=one ton of cooling is the amount of heat absorbed by one ton of ice melting in one day, which is equivalent to 12,000 Btus per hour, or 3.516 kilowatts (kW) (thermal energy)).

A number of different methods have been developed to measure equipment efficiency and stage equipment by their efficiency ratings. These methods include observation and manual modeling of equipment efficiency for certain building conditions (usually including wet bulb air temperature, building load, etc.) along with use of a manufacturer's specification for equipment efficiencies. These parameters are combined with engineering knowledge to provide a static sequencing order that may be used over a period of time to keep energy efficiency high.

While equipment like a chiller is operating, the efficiency of each operating chiller may be measured and compared by an engineer, a building automation system (BAS) or an energy management system (EMS) with the correct instrumentation. By way of example, some engineers may specify the most efficient sequence to run the equipment and that sequence may be controlled manually by operators or it may be hard coded within the BAS to run in that particular sequence in an automated manner.

Many of the conventional sequencing methods involve many hours of labor on the part of a knowledgeable engineer and the sequence modeling typically occurs only at the outset when the equipment is initially commissioned. The "stage and forget" process may be problematic since equipment energy efficiencies can drift over time as parts or components wear, critical operating fluids leak or are used up, and/or conditions change in the system as a whole. Such operational changes directly affect the energy usage of individual pieces of equipment.

The reasons that equipment like chillers, pumps, fans, cooling towers or boilers may have different efficiencies may be due to (1) manufacturing differences (large or small); (2) poor equipment maintenance; (3) equipment wear or broken parts; (4) contamination or loss of refrigerant within a chiller; and/or (5) fouling or buildup of material on working surfaces.

FIG. 1 shows a chart 10 in which energy efficiency 12 is recorded over time 14 for two separate, but otherwise identical chillers 16, 18, respectively. The upper curve 20 shows how the efficiency of first chiller 16 varies over time while the lower curve 22 shows how the efficiency of second chiller 18 varies over time.

Additionally, while the manual sequencing process may capture trends in equipment efficiency it is often unable to observe small fluctuations in efficiency. Since manufacturer specifications are often used in the manual sequencing process it can also be difficult to perceive differences in equipment energy efficiencies for the same model. This may result in operating less efficient equipment, using excess energy that may be "left on the table."

The most predominant and common method to operate and stage equipment involves operating the equipment in an equal runtime rotation scheme. This method rotates the operating sequence of a group of equipment based on the accumulated running hours (or days, or minutes) of each piece of equipment. When one piece of equipment has accumulated a certain number of operational hours than another piece of equipment the operating sequence is rotated. The equipment having the lowest logged hours is rotated in the operating sequence to turn on first, while the equipment having the highest logged hours will be turned on last in the sequence.

Another method to operate and stage equipment involves using a minimum runtime sequence in which the equipment is staged to ensure that each piece of equipment runs for a certain amount of hours every rotation period, which is commonly done to make sure that the equipment does not sit inoperable for a long period. When equipment is left inoperable for long periods of time, the equipment may decay or lose critical operating fluids to leakage or evaporation.

FIG. 2 shows another chart 24 in which measured energy efficiencies 26 are plotted over time 28. Each curve 30, 32, 34 represents the energy efficiencies 26 of three similar chillers respectively, over time. An upward facing arrow 36 indicates that chiller 30 had the best operating efficiency for a period of time, but then began operating at a poorer operating efficiency over a later period of time as indicated by arrow 38.

Over time, the energy efficiencies of the equipment may drift as shown in FIG. 2, and such drifts may be result in a reduced or poorer energy efficiency for that particular equipment. On the flip side, a piece of equipment with a poor energy efficiency may be improved through maintenance, repair, or cleaning, for example.

BRIEF SUMMARY OF THE INVENTION

The present invention is generally directed toward systems and methods for sequencing HVAC equipment of an HVAC system using data recorded in situ to build a model capable of making predictions about equipment efficiency and using that information, in combination with predictions about building load, to produce an operational sequence for the HVAC equipment that promotes an improved or optimized overall energy efficiency for the HVAC system.

In addition, this data, prediction and modeling can be used to determine which pieces of HVAC equipment work more efficiently with other pieces of HVAC equipment, taking into account the covariance between the different pieces of HVAC equipment, producing further sequencing that will operate the HVAC equipment together in efficient covariance combinations, that promotes an improved or optimized overall energy efficiency for the HVAC system.

In addition, this data, prediction and modeling can be used to optimize when best to stage additional HVAC equipment on or off, based on the future load prediction of the HVAC equipment, which promotes an improved or an optimized overall energy efficiency for the HVAC system.

In addition, this data, prediction and modeling can be used to determine at which loads the HVAC equipment operates at its best efficiency, allowing for the load balancing of the different similar pieces of operating HVAC equipment, to keep them operating in their 'Sweet Spot', for example if one chiller operates most efficiently at a load of 500 tons, it can be load balanced via water flow, valves or control set points, to remain operating at that "sweet spot" of 500 tons in parallel with another operating chiller which operates efficiently at 700 tons, also load balanced to operate producing 700 tons via water flow, valves or control set points, to remain operating at that "sweet spot", which promotes an improved or optimized overall energy efficiency for the HVAC system.

In one embodiment, the process is automated and utilizes Bayesian computational models or algorithms to generate an initial sequence. The process reduces engineering hours and may advantageously provide a means to predict potential sequencing problems for similar types of HVAC equipment.

In one aspect of the present invention, a method for sequencing HVAC equipment in an HVAC system includes the steps of (1) acquiring a plurality of inputs including historical data points and predicted data points; (2) determining energy efficiencies for the HVAC equipment; (3) acquiring weather prediction data; (4) using the inputs, energy efficiencies and weather prediction data, computing an expected future load for the HVAC equipment; (5) using the inputs, energy efficiencies, weather prediction data and expected future load, employing an analytical computational model to determine predicted energy efficiencies for the HVAC equipment; (6) determining an initial order of the HVAC equipment configured to provide an optimized energy efficiency for the HVAC system; (7) filtering the initial order based on an operating status for one or more of the HVAC equipment; (8) determining a final sequence of the HVAC equipment; and (9) providing the final sequence to a building automation system for controlling the HVAC system in accordance with the final sequence.

In another aspect of the present invention, a method for sequencing HVAC equipment in an HVAC system includes the steps of (1) acquiring a plurality of inputs including historical data points and predicted data points; (2) determining energy efficiencies for the HVAC equipment; (3) acquiring weather prediction data; (4) using the inputs, energy efficiencies and weather prediction data, computing an expected future load for the HVAC equipment; (5) using the inputs, energy efficiencies, weather prediction data and expected future load, employing a linear regression model to determine predicted energy efficiencies for the HVAC equipment; (6) determining an initial order of the HVAC equipment configured to provide an optimized energy efficiency for the HVAC system; (7) filtering the initial order based on an operating status for one or more of the HVAC equipment; (8) determining a final sequence of the HVAC equipment; and (9) providing the final sequence to a building automation system for controlling the HVAC system in accordance with the final sequence.

In yet another aspect of the present invention, a method for sequencing HVAC equipment in an HVAC system includes the steps of (1) acquiring a plurality of inputs including historical data points and predicted data points; (2) determining energy efficiencies for the HVAC equipment; (3) acquiring weather prediction data; (4) using the inputs, energy efficiencies and weather prediction data, computing an expected future load for the HVAC equipment; (5) using the inputs, energy efficiencies, weather prediction data and expected future load, employing a k-nearest neighbors model to determine predicted energy efficiencies for the HVAC equipment; (6) determining an initial order of the HVAC equipment configured to provide an optimized energy efficiency for the HVAC system; (7) filtering the initial order based on an operating status for one or more of the HVAC equipment; (8) determining a final sequence of the HVAC equipment; and (9) providing the final sequence to a building automation system for controlling the HVAC system in accordance with the final sequence.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with HVAC systems; automation systems (e.g., building automation systems referred to as BASs); air handler units (AHUs) such as, but not limited to terminal units (also called fan coil units), packaged units or rooftop units, and various equipment used in HVAC systems such as, but not limited to, controllable valves, heating and cooling coils, various types of sensors; controllers and processors; communication networks; various computing and/or processing systems; chillers, fans, various HVAC system equipment operational parameters and set points, data points or data points; and methods of operating any of the above with respect to one or more buildings have not necessarily been shown or described in detail to avoid unnecessarily obscuring descriptions of the embodiments of the invention.

One systemic and on-going problem in the HVAV industry is the inability to continually model ongoing dynamic efficiency changes of the HVAC equipment, and then react to such changes in a meaningful manner such as re-ordering the equipment sequencing to improve overall efficiency and reduce operating costs of the HVAC system.

Even if the labor intensive and time intensive manual sequencing process could be done quickly, putting the data to use would be expensive without an automatic method of generating sequencing orders while considering local operating conditions. Any method that models energy efficiency on a per equipment basis should preferably include an automation method that produces a sequencing order.

An embodiment of the present invention includes a method for automatically and dynamically predicting energy efficiency on a per equipment basis and using that information along with local conditions to choose a sequencing order that increases energy efficiency. Further, the chosen sequencing order may allow for the observation of various HVAC equipment efficiencies over time, which in turn may provide a technician or engineer with a better insight about the HVAC system. The automation of such a method would advantageously rebalance equipment loads without requiring direct management, oversight or observation by a knowledgeable technician or engineer. Further, such a method may produce reports that highlight any glaring changes in energy efficiency in a timely manner.

Figure 1:
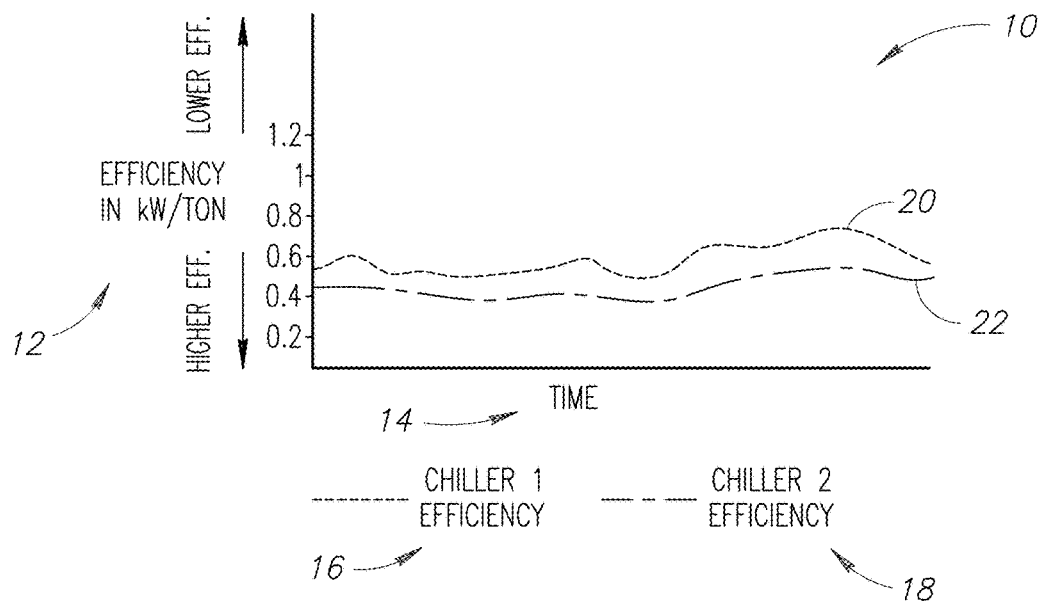
FIG. 1 is a chart showing two similar pieces of HVAC equipment operating at different energy efficiencies over time.
Figure 2:
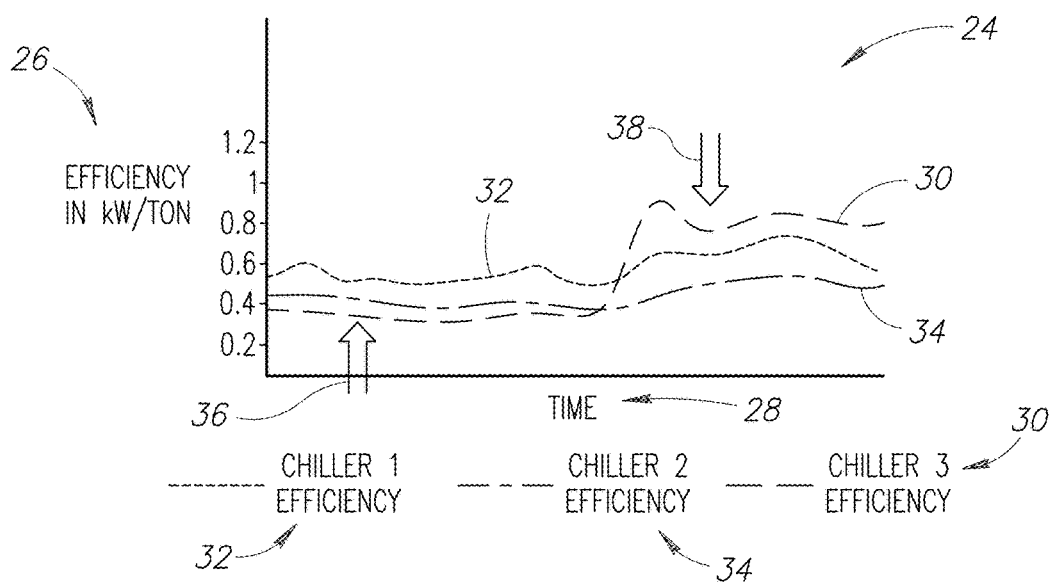
FIG. 2 is a chart showing three similar pieces of HVAC equipment operating at different efficiencies over time.
Figure 3:
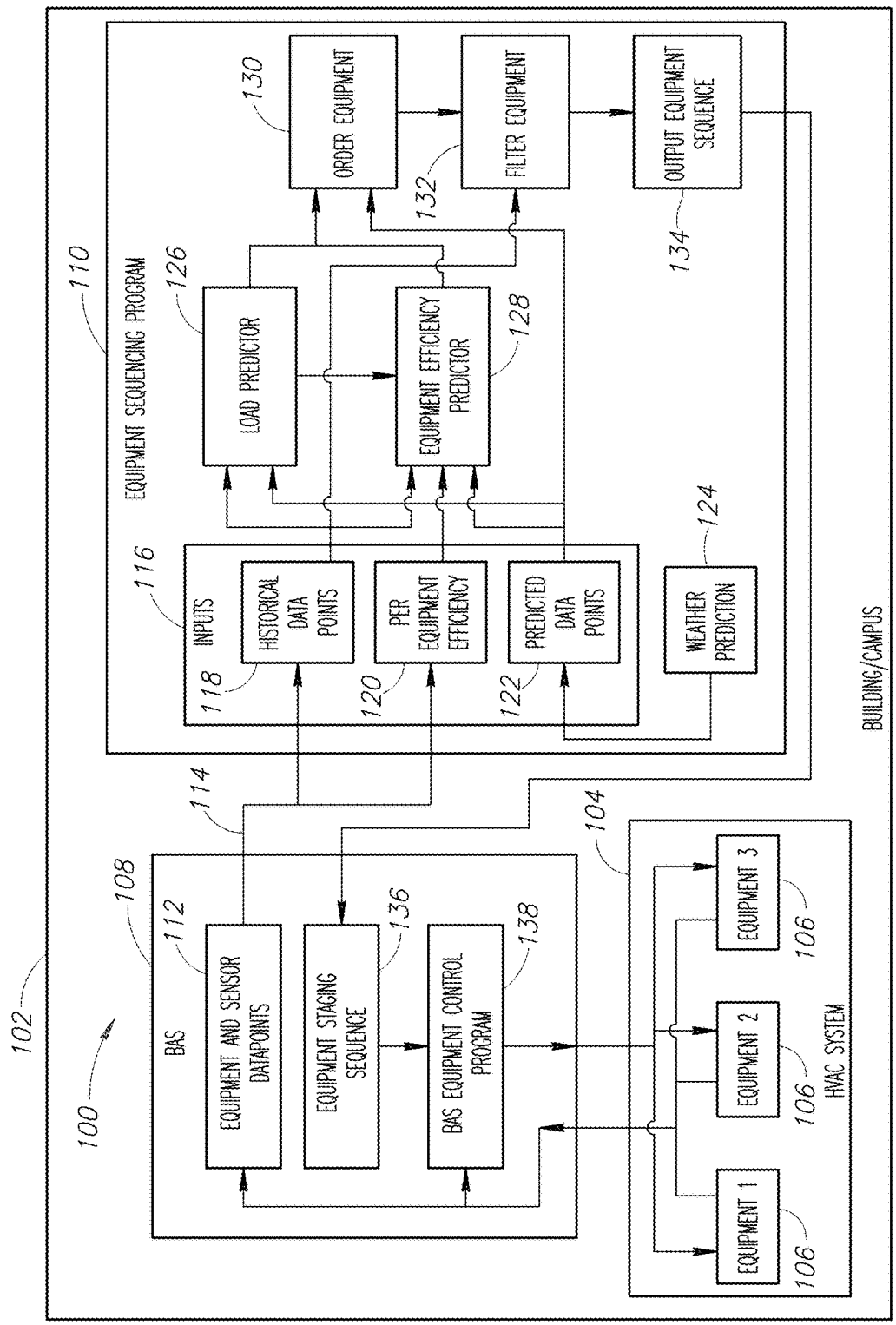
FIG. 3 is a schematic system diagram of an equipment sequencing program in on-site communication with a building automation system (BAS) that controls an HVAC system according to an embodiment of the present invention.

FIG. 3 shows a system diagram 100 for providing intelligent equipment sequencing to a various sets or groups of similar HVAC equipment such as, but not limited to, chillers, boilers, fans, pumps and cooling towers. The term "similar" as used herein means the equipment is of a similar design and size relative to the other equipment. In the illustrated embodiment, the intelligent equipment sequencing occurs on-site, for example on a building site or a campus site (e.g., a site having more than one building or HVAC system). The system diagram 100 shows the overall process for sequencing similar HVAC equipment by their respective energy efficiencies which includes the inputs for the major modules to complete said sequencing.

The outline or border 102 represents a building or a campus, which in turn includes at least one HVAC system 104 having two or more pieces of similar HVAC equipment 106. In the illustrated embodiment and by way of example, the HVAC equipment 106 may take the form of three chillers operating in parallel, but not necessarily all operating at the same time.

In the illustrated embodiment, the HVAC system 104 exchanges data to/from the pieces of equipment 106 with a building automation system (BAS) 108. The BAS 108 controls and runs the equipment 106 to meet a load or demand of the building or campus 102. Further, the BAS 108 operates as a communications interface between an equipment sequencing program 110 and the HVAC system 104.

In operation, data is gathered, in real-time from the equipment 106 and the HVAC system 104. The data is stored in an equipment and sensor database 112 of the BAS 108 and communicated to the equipment sequencing program 110 as operating data 114, which uses a Bayesian method to sequence the equipment 106 as will be explained in further detail below.

In the illustrated embodiment, the equipment sequencing program 110 utilizes a plurality of inputs 116 such as, but not limited to, historical data points 118, per equipment efficiency 120, predicted data points 122 and weather prediction data 124. The historical data points 118 have been recorded, observed, measured or otherwise documented at a prior time.

One type of historical data point 118 may include a historical time at which the data point was recorded. This historical time may be in the form of a universal time code (UTC), a time stamp, or a record of the time in minutes and hours (either 12-hour or 24-hour format). The historical time provides various snapshots and periodic thermal dynamics of the HVAC equipment 106. Another type of historical data point 118 may be a historical date for when the data point was recorded. The historical date preferably may further indicate whether the data point was recorded on a weekend or a weekday, and whether the weekday was a holiday. The historical date information captures load dependency information pertaining to the work schedule of the HVAC system 104 and the similar HVAC equipment 106 to be sequenced. Other historical data points 118 may include a wet bulb outside air temperature, a dry bulb air temperature, and load information of the building or campus. The load information is used by the equipment sequencing program 110 to bind the aforementioned historical data points to a specific load value for the equipment sequencing program.

The per equipment efficiency input 120 is a record of the efficiency of each piece of HVAC equipment, which in turn provides specific efficiency values so that future efficiencies may be predicted. In one embodiment, the per equipment efficiency input 120 is recorded in kilowatt per tons of ice equivalent (it could also be recorded in any other energy efficiency measurement like COP, EER, SEER or IEER).

The inputs 116 further include predicted data points 122. One of the predicted data points 122 includes predicted time information with time stamps or boundaries for a predetermined future time period under consideration. Another one of the predicted data points 122 includes predicted date information and whether such date or dates include a weekend day, a weekday or a holiday.

Lastly, the inputs 116 include weather prediction information that includes a predicted outside air wet bulb temperature, a predicted outside air humidity and a predicted outside air dry bulb temperature, both for the future time period under consideration.

The inputs 116 are communicated or otherwise transmitted to a load predictor module 126, which computes a future load or loads for the HVAC equipment 106 using said inputs 116. In practice, the future load is typically computed for the next day, or for the next 24 hours, but it is appreciated that the future load may be predicted for any reasonable, foreseeable period of time. The load predictor module 126 may assist in predicting equipment efficiency and may also be used to predict a total energy used by the entire HVAC system.

The inputs 116 are also communicated to or transmitted to an equipment efficiency predictor 128, which generates an efficiency model for all of the HVAC equipment 106 to be sequenced. In one embodiment, the equipment efficiency predictor 128 may take the form of a self-learning module that continually updates the efficiency model.

The equipment efficiency predictor 128 may be configured to predict an energy efficiency of the equipment 106 using data from the inputs 116 and load predictor 126. In one embodiment, the equipment efficiency predictor 128 takes the form of a linear regression model that accepts at least the historical data points 118 and the prediction data points 122 to build a model of the HVAC equipment's 106 energy efficiency. The equipment efficiency predictor 128 predicts the energy efficiency for each piece of HVAC equipment 106 at each predicted data point 122. The linear regression model scalarizes the data points 118, 122 by transforming the data points from its native or baseline encoded format to a scalar value that can be manipulated as a number. Next, a linear regression analysis is performed on the inputs 116 with the time information, the date information, the temperature data, and the load as independent variables and the equipment's energy efficiency as the dependent variables. The linear regression model accepts the predicted data 122 and uses the linear regression to make predictions about equipment energy efficiency. Each piece of HVAC equipment 106 may have its own model. The predicted data points 122 along with the predicted efficiency of the HVAC equipment at each predicted data point is then output to an order equipment module 130.

In another embodiment, the equipment efficiency predictor 128 takes the form of a K-nearest neighbors (KNN) model efficiency predictor. This KNN predictor accepts the historical data points 118 and the predicted data points 122 to build a model of the equipment's energy efficiency. The model predicts the energy efficiency for each piece of HVAC equipment 106 at each predicted data point 122. The KNN model scalarizes the data points 118, 122 similar to the linear regression model. Next, the KNN model removes data points that contain invalid data values from both the historical 118 and predicted data points 122. Each dimension of each historical data point 118 is treated as a random distribution of points. The standard deviation and average of this random distribution is computed. All dimensions of each historical data point 118 are normalized by subtracting the average obtained for that dimension and then dividing by the standard deviation for that dimension. This process is repeated on the predicted data points 122, except that the same average and standard deviation derived from the normalizing the historical data points 118 are used to normalize the predicted data points 122. The value of each dimension is re-weighted by multiplying each value for that dimension in both the historical and predicted data points by a constant re-weighting constant.

The KNN model then accepts the historical data points 118 and places them into a KNN space that returns the K neighbors of each input prediction data point that most closely resemble that point. The model returns the average efficiency of the k neighbors for the HVAC equipment along with the original predicted data points 122. For each prediction data point and each piece of HVAC equipment 106, the respective energy efficiency is predicted using the prepared KNN model. Next, the weighting process used is reversed or de-weighted such that each dimension should have the same weight after thereinafter. Lastly, the normalization process is also reversed. Each dimension (along with the predictions of equipment energy efficiency) may be re-scalarized with correct values. The predicted data points 122 along with the predicted efficiency of the HVAC equipment 106 at each predicted data point is then output to the order equipment module 130.

Both the load predictor 126 and equipment efficiency predictor 128 forward their data to the order equipment module 130, which uses this information along with the predicted data points 122 to determine an order of the HVAC equipment 106 by their respective energy efficiency, best operating combinations, best covariance operation and efficient load balancing.

The order equipment module then forwards the order of the HVAC equipment 106 to a filter equipment module 132, which determines what equipment is actually available to be sequenced, as some may not be able to run due to unavailability, minimum runtime, etc. After the HVAC equipment 106 is ordered and filtered, that information is transmitted to an output sequencing module 134.

In the output sequencing module, the data is formatted for consumption by a receiving device or system and is then transmitted to an equipment staging sequence module 136 of the BAS 108. The BAS 108 will take the sequence and use it in conjunction with a BAS equipment control program 138 to operate the HVAC equipment 106 in the most efficient way possible.

Summarizing, one or more embodiments of the present invention provide methods for sequencing HVAC equipment by their respective energy efficiencies. The method accepts two time series as inputs and returns an equipment ordering. The first time series includes historical data recorded at the building or campus. The second time series is a set of predicted data points. These prediction data points are time series predictions for each of the dimensions contained in the historical data points over some future time period under consideration by the load predictor.

The historical data and prediction data is then fed into a load predictor, which in turn uses the historical data to build a model that can predict the future load of HVAC equipment given a time series that contains a prediction of the environmental conditions for the HVAC system in the future. This model is used, along with the predicted data points, to predict the building load for each data point in the predicted data points.

The predicted data points, along with the load predicted for each data point, are next sent to the equipment efficiency predictor. This predictor additionally uses the historical data points. In one embodiment this efficiency predictor uses a linear regression model. Since the historical data points contain dimensions with diverse data types the historical and prediction data points are first scalarized. This process changes each dimension in to a number for use in the linear regression. Next, the scalarized historical data points are modeled using a linear regression model that returns the equipment's efficiency as a linear function of the time, the date, the outside air temperature, the outside air wet bulb temperature, and the load. Next, for each data point in the predicted data points, the energy efficiency for each piece of HVAC equipment is predicted using the predicted data points as input to the model. Further modeling can be done based on best combinations and covariance operation, and efficient load balancing of the HVAC equipment. Finally, the extended prediction data points are output, each containing the information in along with the predicted load and predicted energy efficiency for the equipment.

In another embodiment the efficiency predictor uses a KNN model to predict energy efficiency for the HVAC equipment rather than a linear model. In this process, first the historical data and the prediction data are scalarized so that each dimension of the data points represent a number. Next, the both historical data and prediction data sets are cleaned, with invalid data points removed from both sets. The next step normalizes the historical and prediction data points. This is done by first finding the average and standard deviation of each dimension in the historical data set. Next, each dimension in both the historical data set and prediction data set is normalized by subtracting their respective average from the historical data set and then dividing each of them by the standard deviation. After normalization each dimension of the historical and prediction data sets is re-weighted. This is done by multiplying each value in each of the dimensions by a constant. Next, the historical data is put into a KNN space which builds a model capable of accepting prediction data points, finding historical data points that are close to those prediction data points in terms of the independent variables (time, data, outside air temperature, outside wet bulb air temperature and load) and returning a value for each of the dependent variables (efficiency for each piece of equipment). Finally the extended prediction data points are output after de-weighting by dividing each dimension by its re-weighting constant and de-normalization, reversing the normalization process.

The extended prediction data points are then fed into the order equipment module. In one embodiment, the equipment's predicted energy efficiency is calculated by averaging the predicted energy efficiency determined for the equipment over all time steps. The equipment is then placed in a list in order of its energy efficiency, with highest efficiency first and lowest efficiency last. In another embodiment, the total energy used by the system is predicted for each possible ordering of the HVAC equipment, using the extended prediction data to calculate the amount of energy the HVAC system would use if it were run with that ordering of the HVAC equipment. In another embodiment, the combined efficiency and covariance of the HVAC equipment operating together is modeled and used to extend the prediction data to calculate the least amount of energy the HVAC system would use if it were run with that ordering and sequence of the HVAC equipment. Finally, the ordering that uses the lowest amount of energy is returned as the equipment order.

Next, the equipment orderings are filtered. This process uses knowledge of the current physical state of the HVAC system to remove the pieces of HVAC equipment that are not available for use. Finally, after equipment filtering, a valid equipment sequencing is provided to the BAS for controlling the HVAC system.

Figure 4:
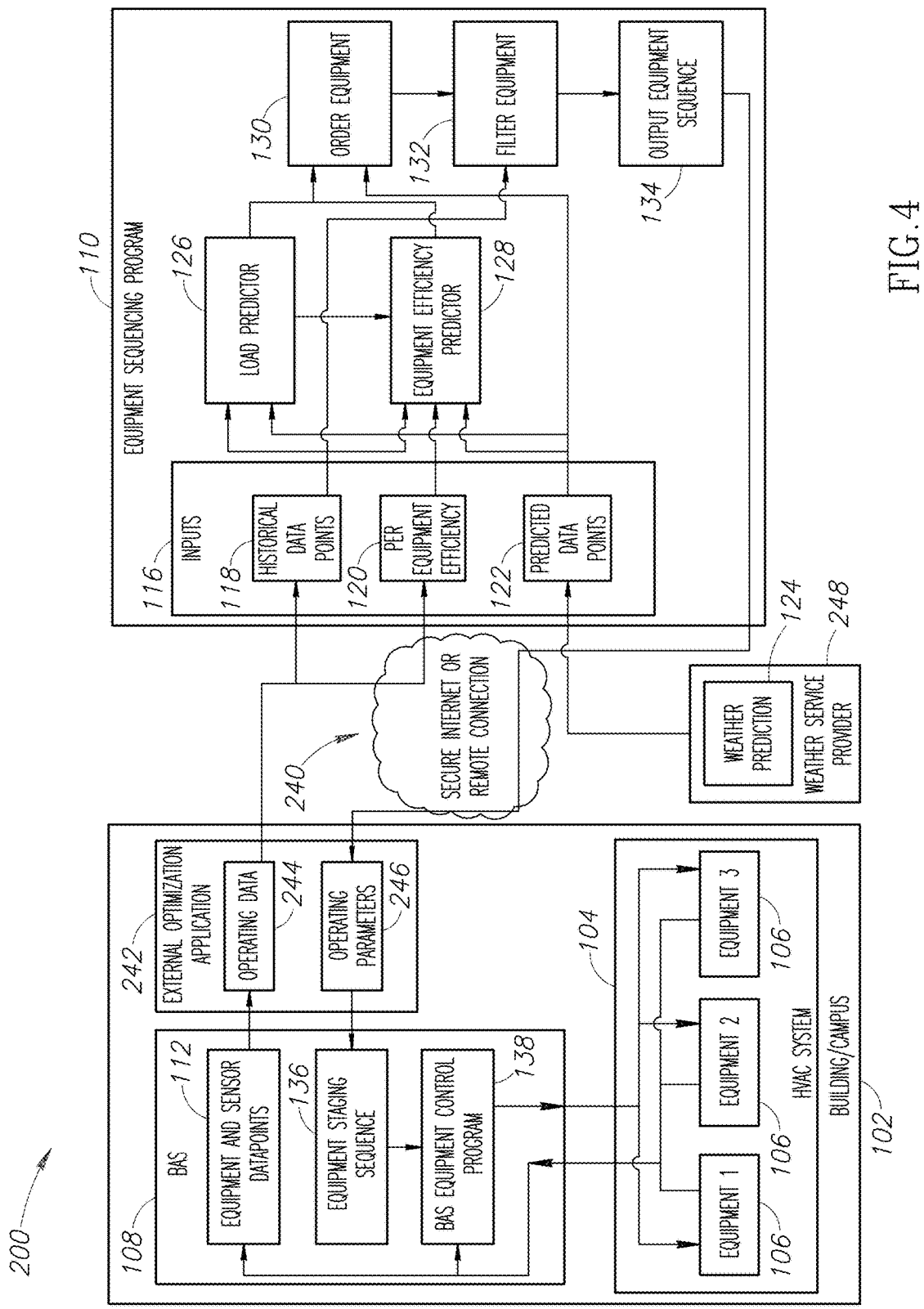
FIG. 4 is a schematic system diagram of an equipment sequencing program that remotely obtains weather data from a weather service provider and where the equipment sequencing program is in remote communication with an external optimization application that provides a communications interface for a building automation system (BAS) that controls an HVAC system according to an embodiment of the present invention.

FIG. 4 shows a system 200 in which data or information is exchanged remotely and/or wirelessly 240. For purpose of brevity and clarity, all components of the system 200 are the same as those illustrated in FIG. 3 except the components having 200 level numbers. In other words, any components of system 200 taken from FIG. 3 retain the same number. In the system 200, the equipment sequencing program 110 communicates remotely with an external optimization application module 242, which functions as a communications interface between the equipment sequencing program 110 and the BAS 108. The external optimization application module 242 may include operating data 244 and operating parameters 246 related to the HVAC equipment 106. In the illustrated embodiment, the weather prediction 124 may be acquired from a third party weather service provider 248 via an application programming interface (API) over the Internet.

While the preferred embodiment of the invention has been illustrated and described, as noted above, many changes can be made without departing from the spirit and scope of the invention. In addition, other advantages will also be apparent to those of skill in the art with respect to any of the above-described embodiments whether viewed individually or in some combination thereof. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An equipment-sequencing processing device configured to execute a method for sequencing HVAC equipment in an HVAC system, the method comprising:
   acquiring a plurality of inputs including historical weather data and data representing at least one future time period of interest;
   determining energy efficiencies for the HVAC equipment;
   acquiring weather prediction data associated with the at least one future time period of interest;
   using the inputs, energy efficiencies and weather prediction data, computing an expected future load for the HVAC equipment;
   using the inputs, energy efficiencies, weather prediction data and expected future load, employing an analytical computational model to determine predicted energy efficiencies for the HVAC equipment;
   determining an initial sequence of operation of the HVAC equipment configured to provide an optimized energy efficiency for the HVAC system;
   determining the availability of the HVAC equipment included in the initial order based on an operating status for one or more of the HVAC equipment;
   determining, based on the determination of availability of the HVAC equipment, a final sequence of the HVAC equipment; and
   providing the final sequence to a building automation system for controlling the HVAC system in accordance with the final sequence.

2. The device of claim 1, wherein determining the energy efficiencies includes determining real-time energy efficiencies.

3. The device of claim 1, wherein determining the energy efficiencies includes determining historical energy efficiencies.

4. The device of claim 1, wherein acquiring the weather prediction data includes obtaining the weather prediction data from a third party source.

5. The device of claim 1, wherein the analytical computational model is a Bayesian based model using a linear regression analysis.

6. The device of claim 1, wherein the analytical computational model is a Bayesian based model using a k-nearest neighbors analysis.

7. An equipment-sequencing processing device configured to execute a method for sequencing HVAC equipment in an HVAC system, the method comprising:
   acquiring a plurality of inputs including historical weather data points and data representing at least one future time period of interest;
   determining energy efficiencies for the HVAC equipment;

acquiring weather prediction data associated with the at least one future time period of interest;

using the inputs, energy efficiencies and weather prediction data, computing an expected future load for the HVAC equipment;

using the inputs, energy efficiencies, weather prediction data and expected future load, employing a linear regression model to determine predicted energy efficiencies for the HVAC equipment;

determining an initial sequence of operation of the HVAC equipment configured to provide an optimized energy efficiency for the HVAC system;

determining the availability of the HVAC equipment included in the initial order based on an operating status for one or more of the HVAC equipment;

determining, based on the determination of availability of the HVAC equipment, a final sequence of the HVAC equipment; and providing the final sequence to a building automation system for controlling the HVAC system in accordance with the final sequence.

8. The device of claim 7, wherein determining the energy efficiencies includes determining real-time energy efficiencies.

9. The device of claim 7, wherein determining the energy efficiencies includes determining historical energy efficiencies.

10. The device of claim 7, wherein acquiring the weather prediction data includes obtaining the weather prediction data from a third party source.

11. An equipment-sequencing processing device configured to execute a method for sequencing HVAC equipment in an HVAC system, the method comprising:

acquiring a plurality of inputs including historical weather data and data representing at least one future time period of interest;

determining energy efficiencies for the HVAC equipment;

acquiring weather prediction data associated with the at least one future time period of interest;

using the inputs, energy efficiencies and weather prediction data, computing an expected future load for the HVAC equipment;

using the inputs, energy efficiencies, weather prediction data and expected future load, employing a k-nearest neighbors model to determine predicted energy efficiencies for the HVAC equipment;

determining an initial sequence of operation of the HVAC equipment configured to provide an optimized energy efficiency for the HVAC system;

determining the availability of the HVAC equipment included in the initial order based on an operating status for one or more of the HVAC equipment;

determining, based on the determination of availability of the HVAC equipment, a final sequence of the HVAC equipment; and providing the final sequence to a building automation system for controlling the HVAC system in accordance with the final sequence.

12. The device of claim 11, wherein determining the energy efficiencies includes determining real-time energy efficiencies.

13. The device of claim 11, wherein determining the energy efficiencies includes determining historical energy efficiencies.

14. The device of claim 11, wherein acquiring the weather prediction data includes obtaining the weather prediction data from a third party source.

\* \* \* \* \*